(12) United States Patent
Babu et al.

(10) Patent No.: US 8,949,143 B2
(45) Date of Patent: Feb. 3, 2015

(54) SMART DATA FILTER FOR POS SYSTEMS

(75) Inventors: Ganesh G. Babu, Coimbatore (IN); Sundaresan K. Meenakshi, Madurai (IN); Abdul M. Raheem, Madurai (IN); Sivakumar Balakrishnan, Madurai (IN); Gopalakrishnan V. Venkatesan, Madurai (IN); Marine Drive, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 934 days.

(21) Appl. No.: 11/957,758

(22) Filed: Dec. 17, 2007

(65) Prior Publication Data

US 2009/0157516 A1    Jun. 18, 2009

(51) Int. Cl.
| G06Q 20/00 | (2012.01) |
| G06F 9/00 | (2006.01) |
| G07G 1/14 | (2006.01) |
| G06Q 20/20 | (2012.01) |

(52) U.S. Cl.
CPC . *G07G 1/14* (2013.01); *G06Q 20/20* (2013.01)
USPC .............................................. 705/16; 726/13

(58) Field of Classification Search
USPC ......................................................... 348/143
See application file for complete search history.

(56) References Cited

U.S. PATENT DOCUMENTS

| 5,899,991 A * | 5/1999 | Karch ........................... 707/694 |
| 6,847,393 B2 | 1/2005 | Ashe et al. |
| 7,731,084 B2 * | 6/2010 | Redick et al. ................. 235/379 |
| 2003/0098910 A1* | 5/2003 | Kim .............................. 348/150 |
| 2005/0162515 A1* | 7/2005 | Venetianer et al. ........... 348/143 |
| 2007/0089172 A1* | 4/2007 | Bare et al. ....................... 726/24 |

\* cited by examiner

*Primary Examiner* — Ryan Zeender
*Assistant Examiner* — Denisse Ortiz Roman
(74) *Attorney, Agent, or Firm* — Husch Blackwell LLP

(57) ABSTRACT

The inventive system and method for processing transactional data in a point of sale environment that has a video device, a POS terminal and an end recording device comprises a configuration tool, and a filtering unit having a filter comprising subfilters for filtering transactional data, such that the configuration tool creates the filter. The configuration tool can create and/or modify the filter based on user input, and this input can be through a web interface. In the alternative, the system also has at least one pre-defined set of rules accessible through a web interface, such that the configuration tool uses one of the pre-defined sets of rules to create the filter.

16 Claims, 7 Drawing Sheets

Cash register - Casio QT-7300 (Original)

*Input and Output:*

| Input | Output |
|---|---|
| Welcome to<br>Casio Inc ☐ @ ☐<br>Soda 1.25<br>Total 1.34 ☐ @ ☐<br>Tea 1.25<br>Total 2.68 ☐ @ ☐<br><br>Total 2.68 ☐ @ ☐<br>Tea 1.25 | Soda    1.25<br>Total   1.34<br><br>Tea    1.25<br>Total   2.68<br><br>Total:  2.68 |

Fig. 4

*Filter definitions:*

| Name of the filter condition | Conditions and Actions ⌐24  ⌐26 |
|---|---|
| Initial Junk | If<br>  string = "=<<0xff>>"<br>then<br>  remove the characters<br>  and remove next characters until occurrence of "<<0x1f>>" |
| Rate | If<br>  Data Type is Float value with a decimal point<br>then<br>  start a new column before the condition |
| Welcome to | If<br>  string = "Welcome to"<br>then<br>  remove the entire line |
| Casio Inc | If<br>  string = "Casio Inc"<br>then<br>  remove the entire line |
| New Line | If<br>  string = "<<0x0a>>"<br>then<br>  remove the characters<br>  and start a new line |
| Start of line | If<br>  string = "<<0x00>>"<br>then<br>  remove the characters<br>  and remove next characters until occurrence of "<<0x1f>>" |

Fig. 5

SMART DATA FILTER FOR POS SYSTEMS

FIELD OF THE INVENTION

This invention relates generally to security for point of sale systems. In particular, this invention relates to processing transactional data to enhance the security of a point of sale system.

BACKGROUND OF THE INVENTION

Many commercial establishments employ video systems that record activities at various locations within the premises of the establishment for the purpose of surveillance. One of the important locations to watch is the place where money transactions occur, that is, the Point-Of-Sale (POS) locations. Although a video recording at POS is essential piece of security equipment, it is not sufficient, because a video system can capture only what is happening at the location but cannot decipher why it is happening. To understand the complete situation, it is also necessary to record all the buying and selling details occurring at the location, such as the details or data entered in billing-machines or cash registers.

Typically, an establishment's employee, or cashier, enters identification and quantity of a product to be purchased into the cash register that then sends the "sale" transaction, e.g., Product Name, Quantity and Price, to a printer for printing the bill or sales receipt. By capturing this sale transaction and comparing it with the video recording, it is possible to get comprehensive details of what is happening at the POS location. Because all of the transactions that happen at the POS location are sent from the cash register to the printer, a transaction-capturing device can be placed between the cash register and the printer to capture these transactions. The device then formats the captured data and sends it to the video system that records the video along with the transactions, so that any transaction that needs to be verified for its validity can be checked with the corresponding video.

The need for this verification often happens, for example, with transactions termed 'Void' transactions. A void transaction is one that has been cancelled by the cashier for a variety of reasons, such as the product is damaged or defective. In a void transaction, no money is taken from a purchaser, but the product's tag is disabled. It is therefore possible for the employee or cashier at the POS to record a void transaction and give away the product to the customer, who can take it without raising any alarms. However, if a video with the transactions were saved, it would be possible to detect such frauds on comparing both.

For saving or storage purposes, the video system requires only the specific transaction information and does not require redundant data like printer commands, bill header information, etc. Such redundant data, as well as other junk characters, make finding the transactions that need to be verified difficult and cumbersome, since a large amount of data would have to be examined. The redundant information will also increase the storage space. Accordingly, the transaction-capturing device will be programmed to eliminate this data before transmitting transaction information to the video system. However, since each cash register may generate a different format for its output, the same firmware cannot be used at all locations. The firmware will need to be programmed to accommodate the cash register and location specific details.

Among the problems of the aforementioned systems is the necessity for the firmware to directly interface with the cash register, so that distinct firmware is needed for each type of cash register. Hence, a new cash register will require the development of new firmware, because if the programmed firmware does not match the cash register for which it was designed, the transaction data will be difficult to decipher. Further, if the commercial establishment changes the cash register it uses, the transaction capturing device has to be re-programmed with the firmware that supports the new cash-register. Thus, the problem of maintaining a large database of firmware and deploying the right one for a cash register occurs.

U.S. Pat. No. 6,847,393, Ashe et al., for Method and System for Monitoring Point of Sale Exceptions, discloses analyzing event transactional data for certain patterns or occurrences. The system defines events that enable the identification of abnormal repetitions or patterns of certain activities that are indicative of fraud, theft or inadequate training that warrant investigation. Instead of a separate transaction-capturing device, a software machine collects both transactional data and video signals, and processes the information to raise exceptions. Ashe et al. do not remove redundant data; instead they process all data in hopes of identifying pre-defined events and detecting fraudulent information.

SUMMARY OF THE INVENTION

The present invention advantageously provides a system and method in which the output from a cash register can be combined with video recordings and used by any device for various purposes, including fraud detection, transaction recording for auditing, transaction recording for analysis on sales, etc. This invention deals with creating and maintaining filters or rules for processing the transactional data so as to eliminate the redundant information from the data and hence reduce the data saved in a database or other device having video and its matching transactional data. The transactional data from the cash register is formatted and sent to another device that can also perform further processing for fraud analysis.

The inventive system and method for processing transactional data in a point of sale environment that has a video device, a POS terminal and an end recording device comprises a configuration tool, and a filtering unit having filters comprising subfilters for filtering transactional data, such that the configuration tool creates the filters. The configuration tool can create and/or modify the filters based on user input, and this input can be through a web interface. In the alternative, the system also has at least one pre-defined filter or pre-defined set of rules accessible through a web interface, such that the configuration tool uses one of the pre-defined sets of rules to create the filters.

The foregoing and other objects, aspects, features, advantages of the invention will become more apparent from the following description and from the claims.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings:

FIG. 4 is an example of transactional data;

FIG. 5 is an example of the filter definition corresponding to FIG. 4;

DETAILED DESCRIPTION OF THE INVENTION

An inventive solution is presented to the need for enhancing the security of a point of sale environment by combining transactional data with video information recorded in the environment. The novel solution includes a configuration tool that enables a user or technician to create and/or modify a filter or rules, and further enables the filter to operate. The filter defines subfilters or conditions and actions to remove unwanted data and/or special characters from the original transaction data based on the specific type of POS system. This novel configuration tool can be activated in situ. Examples of the various conditions and actions incorporated within the filter generated by the configuration tool are described in more detail below.

Figure 1:
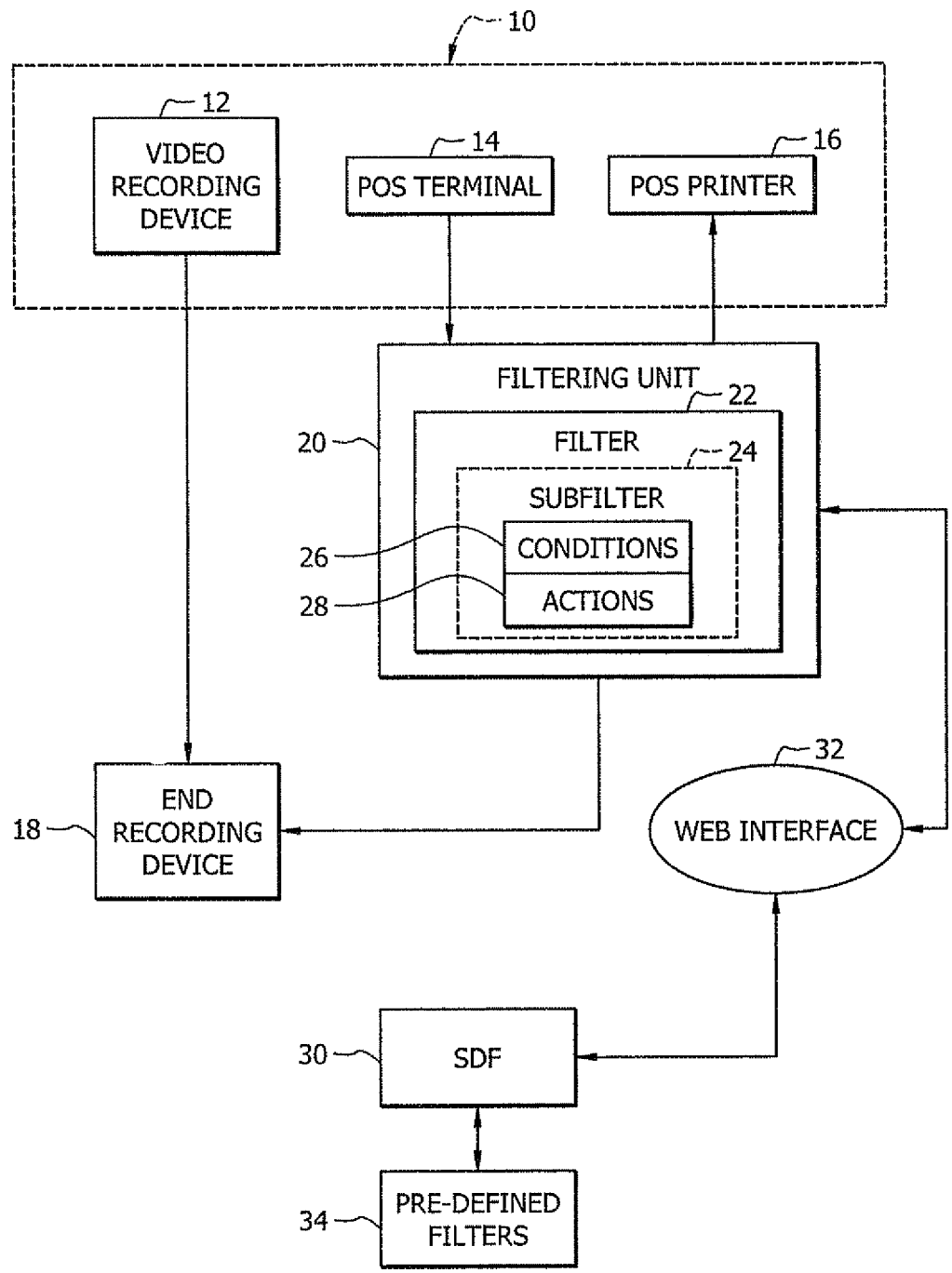
FIG. 1 is a block diagram of an exemplary embodiment of the present invention.

FIG. 1 illustrates a point of sale environment 10 having a camera or video recording device 12, a POS terminal 14, and a POS printer 16. The camera 12 transmits its recorded video output to an end recording device 18. The terminal 14 transmits its transactional or incoming data to a filtering unit 20 that transmits the transactional data to the printer 16. In addition, the filtering unit 20 has a filter 22 that filters the transactional or incoming data in accordance with the subfilters 24 made up of conditions 26 and corresponding actions 28, discussed below. The filter 22 can be created and/or modified by the configuration tool 30, discussed below, via a web interface 32.

The filtered data is transmitted to the end recording device 18 and combined with the video output from the camera 12, providing both visual and transactional details about each POS transaction. Examples of recording devices include Rapid Eye, IDM or others for HRXD, HRDV, HRDVS or Fusion. Transmission within the point of sale environment 10 can be performed using RS2 34/422/485, or TCP/IP or USB.

An exemplary configuration tool 30 is a SmartDataFilter (SDF) through which the user or technician defines and/or modifies filters 22 for POS applications, and through which the filter 22 is executed in the filtering unit 20. Various methods can be employed to create these filters 22. In one approach, a filter 22 can be selected by an installer or technician from pre-defined filters or pre-defined sets of rules 34 from the web interface 32, and deployed in the field, for example when the SDF 30 is initially installed and/or when the POS environment 10 is initially established. In a variation of this approach, during the installation process the pre-defined set of rules 34 can be downloaded from the web interface 32, stored as a filter 22, and then modified by the installer using SDF 30 by changing or adding conditions 26 and actions 28. The SDF 30 communicates through the web interface 32 enabling a user or technician to make modifications to the filter 22 from a remote location. This technique eliminates the need for a new filter 22 for every cash register make and/or every bill format.

In another situation, a new filter 22 can be defined by freshly capturing the data at the installation site of the filtering unit 20. The captured data will reveal appropriate conditions 26 and actions 28, such as the characters that indicate a print condition 26 that can be eliminated with a remove action 28. This is appropriate, for example, when a new cash register or bill format is introduced into a POS environment 10.

In yet another situation, a filter 22 in one POS environment can be transmitted from its device or filtering unit 20 using the web interface 32, and this existing filter 22 can become a pre-defined set of rules 34 which can then be loaded onto another device 20. This is appropriate, for example, when a new POS system or environment 10 is being installed at a new location but the system 10 includes cash registers and/or billing formats, as well as a filtering unit or other known device 20 already operating in another location or POS environment 10.

The filtering unit 20 having the configuration tool or SDF 30 can operate in three different modes, namely, Capture, Real Time and Simulation. In capture mode, the transactional data sent from the POS terminal 14 is saved in the filtering unit 20 to define filter 22. In this mode, additional filter definitions or conditions 26 and corresponding actions 28 can be created through the SDF 30.

Once the filter 22 is defined, it can be installed on the filtering unit 20, and/or made available for selection from the web interface 32 and loaded to the filtering unit 20. Then, the filter's configuration can be set to Real Time. The POS environment 10 operates with the filter 22 in Real Time mode, so that the incoming data is filtered appropriately, and the output, or filtered transactional data, is sent to the end recording device 18.

In simulation mode, the selected filter 22 is applied to the captured data that had already been stored, and filtered transactional data or output is sent to the end recording device 18. This mode can be used for demonstration purposes.

Figure 2:
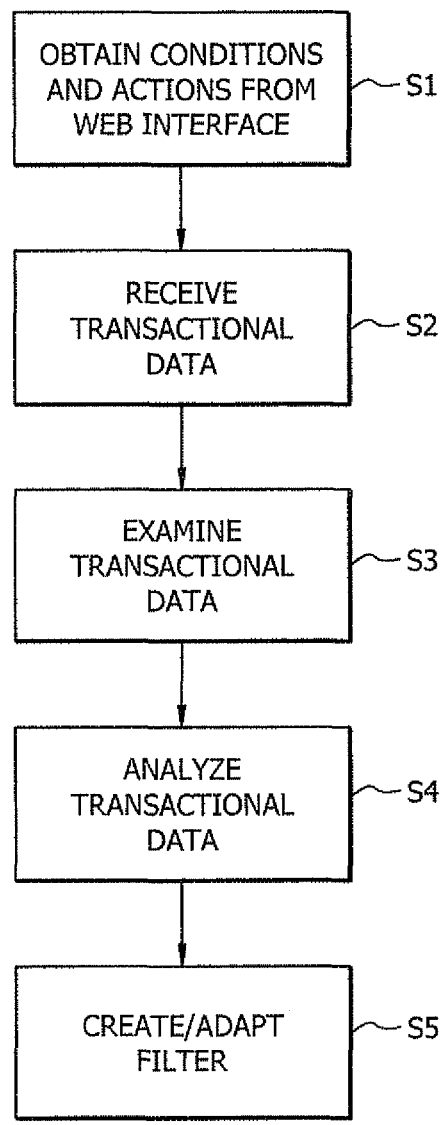
FIG. 2 is a flow diagram of the capture mode of the present invention.

FIG. 2 shows the steps the filtering unit 20 with SDF 30 performs in capture mode to adapt to the data from the terminals or cash registers 14 and to create a filter 22. Prior to commencing capture mode, in step S1, the SDF 30 can, if desired, obtain a set of conditions 26 and actions 28 from the web interface 32. In step S2, the filtering unit 20 receives the transactional data from the terminal 14. This data is examined by the filtering unit 20 in step S3, and recurring or redundant data are identified, based on previously captured data, or conditions 26 and actions 28 from the web interface 32, or both. The user or technician analyzes the identified data in step S4. Based on this analysis, new and/or modified filterable conditions 26 and actions 28 can be created by the user. These conditions 26 and actions 28 determine whether or not a data can be eliminated, and form a filter 22.

Figure 3:
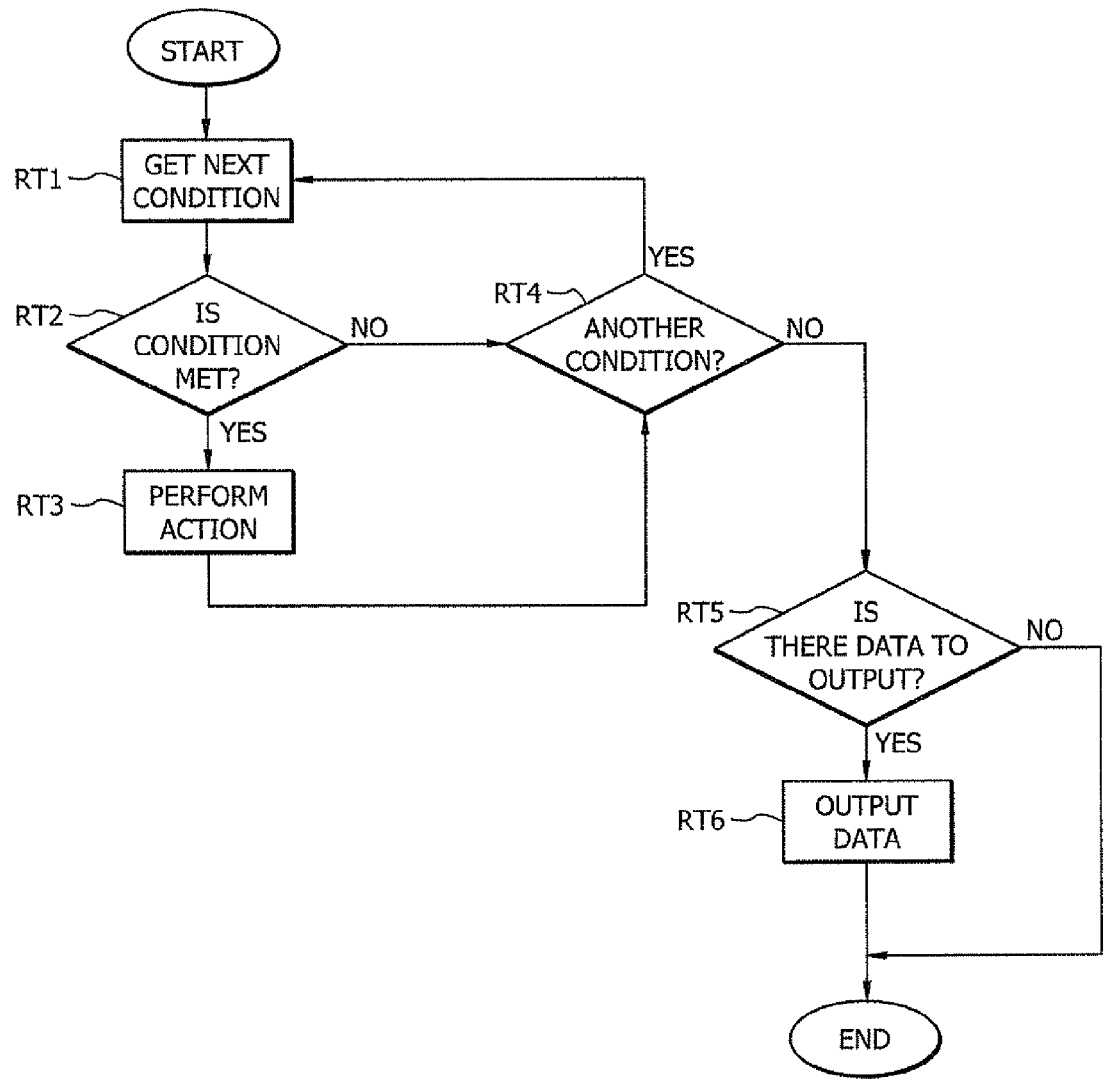
FIG. 3 is a flow diagram of the real time mode of the present invention.

FIG. 3 shows the steps the filtering unit 20 performs on one unfiltered transactional data in real time mode to select and forward the appropriate transactional data. In step RT1, a condition 26 is obtained from the filter 22. In step RT2, the unfiltered transactional data from the POS terminal 14 is tested for the obtained condition 26. If the condition 26 is met (RT2=YES), then an action 28 corresponding to the condition 26 is performed in step RT3.

After the action 28 is performed in step RT3, or if the condition 26 is not met (RT2=NO), a determination is made as to whether more conditions 26 are present in the filter 22 in step RT4. If there are more conditions 26 (RT4=YES), processing returns to step RT1. If there are no more conditions 26 (RT4=NO), in step RT5, a test for data to be output is performed. If the action 28 produced data to be output (RT5=YES), the data is output in step RT6. After the data is output, or if there is no data to be output (RT5=NO), the process terminates. Note that each condition 26 and action 28 included in the 'if . . . then' statement is executed sequentially.

FIG. 4 illustrates inputs and outputs for a particular cash register bill. FIG. 5 shows the filter definitions, including conditions 26 and actions 28 for the cash register shown in FIG. 4. For example, the first input line from the cash register has transactional data of "Welcome to". When this input is obtained by the filter 22, it recognizes that its input matches a condition 26 whose corresponding action 28 is "remove entire line". Thus, the phrase "Welcome to" is removed and does not appear in the output. Other actions 28 performed include, for example, removing characters and starting a new line, in response to the condition 26 of the occurrence of string "<<0x0a>>" displayed in the input portion of FIG. 4 as "☐ @ ☐" on lines 4, 6 and 8.

Other exemplary filter conditions 26 include specific characters, specific types of characters, and specific data types. Exemplary filter actions 28 include removing the character, removing the entire line, removing 'n' previous characters, removing 'n' next characters, removing previous characters until an occurrence of the string, removing next characters until an occurrence of the string, moving to the next column, moving to the next line, create a new column before the present data, and creating a new line before the present data.

Figure 6:
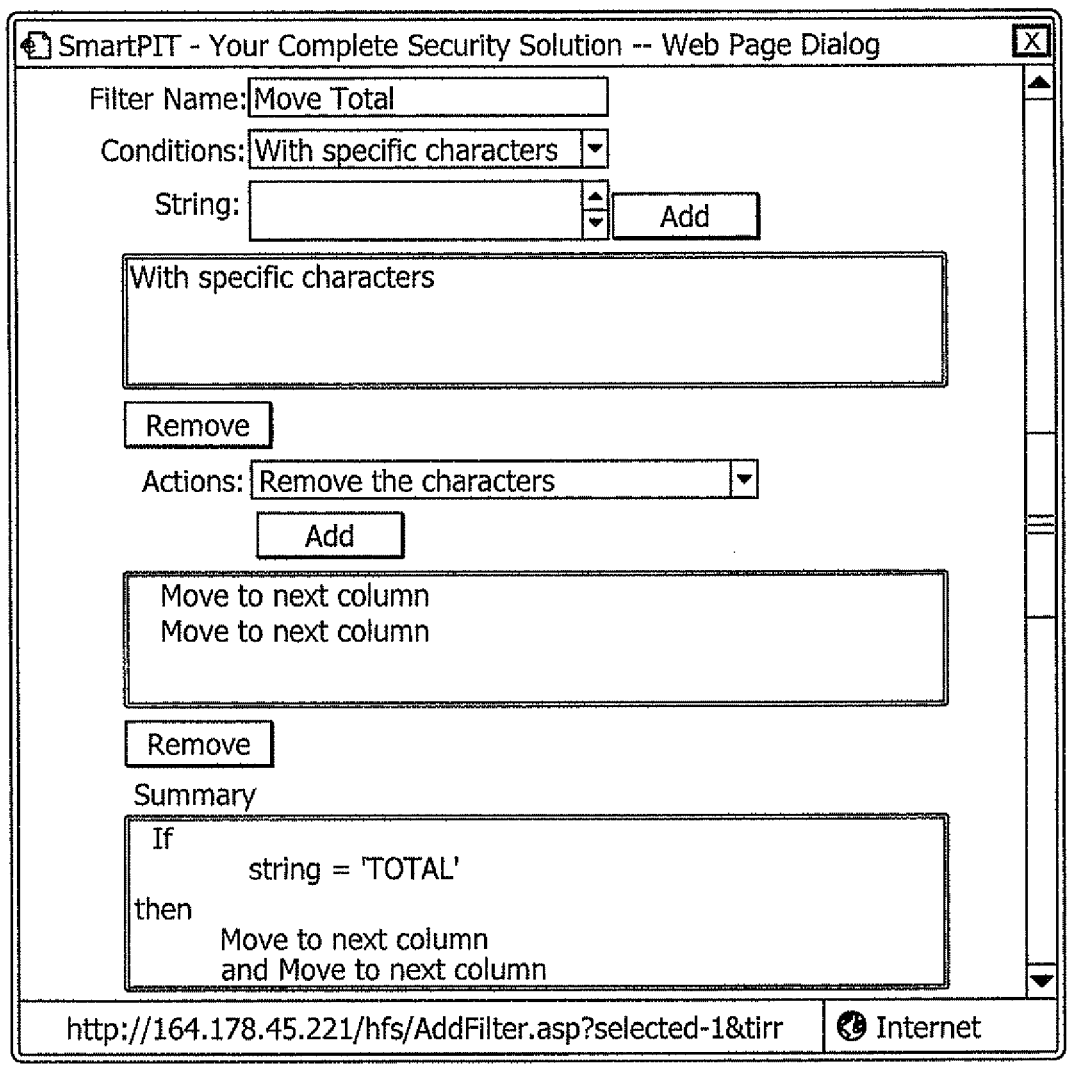
FIG. 6 is a dialog box for an embodiment of the present invention.

The filter 22 can be modified, that is, conditions 26 and corresponding actions 28 can be added, modified and/or deleted from the filter 22 using SDF 20. In one embodiment of the invention, the following nine steps can be used to create a new condition 26 and corresponding action 28 in the filter 22. An exemplary dialog box for this embodiment is shown in FIG. 6. This is provided for illustrative purposes and is not meant to limit the scope of the invention. Other steps or steps in other combinations not listed are also within the scope of the invention.

1. In the SmartDataFilter view select the required SmartDataFilter from the Filters list and click Load.
2. The filter is loaded and a list of existing sub filters for the SmartDataFilter file are displayed in the Filters list. Click Add to display the Sub Filters dialog box.
3. Enter a name in the Filter Name field.
4. From the Conditions list select With specific characters and proceed to step 5
   —or—
   select With a specific type of character and proceed to step 6
   —or—
   select With a specific data type and proceed to step 7.
5. In the String field enter the specific case sensitive characters for the 'If . . . ' statement, including spaces, as well as copying and pasting control characters from the Captured Text field in the SmartDataFilter view if required. Click Add and proceed to step 8.
6. From the Character Type list select the required character type for the 'If . . . ' statement and click Add. Proceed to step 8.
7. From the Data Type list select the required number formatting for the 'If . . . ' statement and click Add. Proceed to step 8.
8. From the Actions list select the required actions that will form the ' . . . then' statement and click Add for each action.
9. The completed filter is displayed in the Summary field. Click Save and the filter is added to the Filters list for the SmartDataFilter file.

Figure 7:
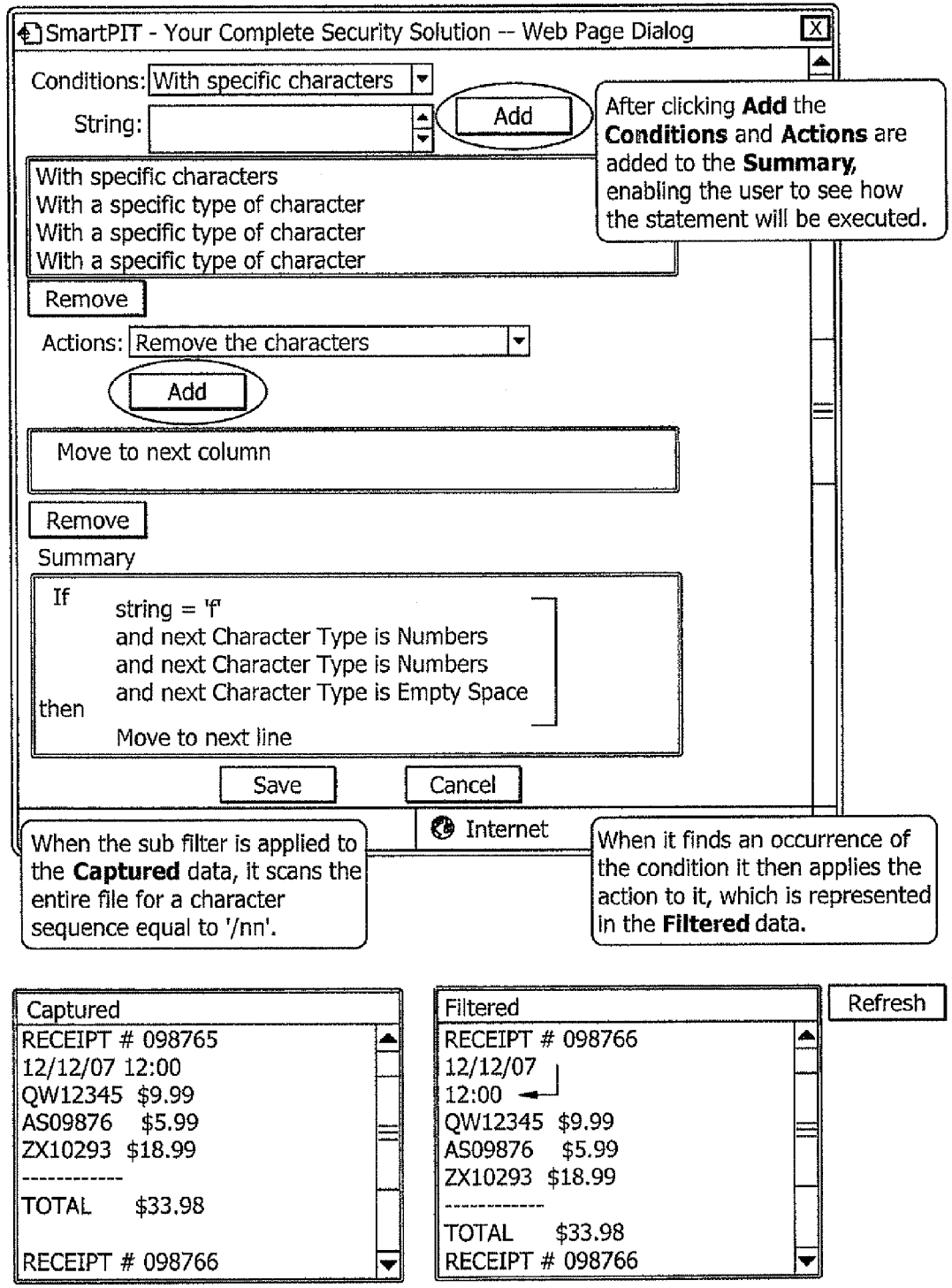
FIG. 7 is an example of the operation of a filter.

FIG. 7 is an example of the operation of a filter 22. When the SDF 30 adds new condition 26 and corresponding action 28 to a filter 22, the effect of this addition can be tested on captured data. In FIG. 7, the condition "with specific characters" having "/" followed by two numbers and an empty space causes the action of moving to the next line. The result of this new condition is shown in the bottom right-hand panel of FIG. 7, in which, after the date text of "12/12/07", the next text "12:00" is printed on a new line.

Other examples of conditions 26 and actions 28 are as follows. These are provided for illustrative purposes and are not meant to limit the scope of the invention. Other conditions 26 and/or actions 28 not listed are also within the scope of the invention.

As discussed above, conditions 26 are used to build the 'if . . . ' portion of an 'if . . . then' statement in a subfilter 24. Multiple conditions of different types can be used. Each condition is evaluated in sequential order and all conditions must be true for the statement to be valid.

Condition Type of "With Specific Characters"

This condition type provides a free form text field where specific, case sensitive characters can be entered. Control characters can also be copied and pasted from the Captured Text field and while they do not appear in the String text field, when Add is clicked the control characters are displayed in the Summary field. Examples: 'h', 'A10', '<<0x0d>><<0x0a>>'

Condition Type of "With a Specific Type of Character"

This condition type provides the ability to search for specific character types. Both printable and non printable characters can be identified. When using this condition, the firmware looks at each individual character in isolation to determine its type. Some exemplary types with examples follow. Numbers can include—'2', '3', '4'; letters and symbols can include 'a', 'B', '#'; Alphanumeric characters can include 'a', '1', 'Z', '*', as well as a 'blank space' character, such as that between a first and last name, e.g. ' '. Non-Printable characters, typically a hexadecimal character that is used in instances such as a carriage return, may or may not be visible in the Captured Text field. Examples are '^', '<<0x0d>>'. Printable characters that are visible in the Captured Text field, except for characters generated by a serial device, such as those mentioned in Non Printable types, can include '$', '3', 'e'.

Condition Type of "With a Specific Data Type"

This condition type is used to identify different types of number formatting. Unlike the 'With a specific type of character' condition, these data types refer to a complete series of numbers instead of individual characters. Examples include a series of numbers without a decimal point, such as '8', '888', '35', a series of numbers that may or may not contain a decimal point, such as '0.99', '341', '1.000', and a series of numbers that contains a decimal point, such as '12.99', '4.123'

Actions 28, as discussed above, will be applied sequentially to the corresponding characters, when all of the 'if . . . ' conditions 26 in a subfilter 24 have been evaluated as true. The different actions 28 enable the transaction data to be filtered and then sent to an end recording device 18 such as Rapid Eye or IDM. As illustrated in the SmartDataFilter view shown in FIG. 7, when actions 28 are successfully applied to characters in the Captured Text field, the results are displayed in the Filtered text field.

Action "Remove the Characters"

Any characters identified by the sub filter's 24 conditions 26 are deleted.

Action "Remove the Entire Line"

The entire line, designated by a carriage return at the end, of data that contains the characters identified in the condition is deleted.

Action "Remove 'n' Previous Characters"

Remove a user defined amount of characters beginning with the first character preceding the characters identified by the successful 'if . . . ' statement.

Action "Remove 'n' Next Characters"

Remove a user defined amount of characters beginning with the first character after the characters identified by the successful 'if . . . ' statement.

Action "Remove Previous Character Until Occurrence of a String"

Remove any number and type of character between the user defined string and the first character preceding the characters identified by the successful 'if . . . ' statements Action "Remove Next Character Until Occurrence of a String"

Remove any number and type of character between the user defined string and the first character after the characters identified by the successful 'if . . . ' statement.

Action "Move to Next Column"

Move the characters identified by the 'if . . . ' statement to the next column in the line of data, a column representing one character space.

Action "Move to Next Line"

Moves any characters on a line of data onto a new line that are after the characters identified by the successful 'if . . . ' statement.

Action "Create New Column Before"

Add a character'space before the characters identified by the 'if . . . ' statement.

Action "Create New Line Before"

Add a new line before the characters identified by the 'if . . . ' statement. Note that for a new line to be created, there must be existing characters to place on that line, otherwise the action will have no effect.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A system for processing transactional data in a point of sale environment, said system comprising:
   a configuration tool; and
   a filtering unit having an input that receives transactional data including at least alphanumeric characters under a printer format defined by the point of sale environment and a filter, the filter comprising at least one subfilter for filtering transactional data, wherein said configuration tool creates said rules and wherein said filter includes a filter condition defined by a predetermined data sequence within the processed transactional data and a filtering action defined by a set of steps that modify a portion of the processed transactional data by deleting at least some characters from the processed transactional data received through the input in response to matching the portion of the processed transactional data with the predetermined data sequence.

2. The system according to claim 1, further comprising at least one pre-defined set of rules accessible through a web interface, wherein said configuration tool uses one of said at least one pre-defined set of rules to create said filter.

3. The system according to claim 2, wherein said configuration tool modifies said filter by performing at least one of adding at least one subfilter, changing at least one subfilter, and deleting at least one subfilter, in response to a user input.

4. The system according to claim 1, wherein said configuration tool creates said filter in response to a first user input.

5. The system according to claim 4, wherein said configuration tool creates said filter by adding at least one subfilter.

6. The system according to claim 4, wherein said configuration tool modifies said filter by performing at least one of adding at least one subfilter, changing at least one subfilter, and deleting at least one subfilter, in response to a second user input.

7. A method for processing transactional data in a point of sale environment, said method comprising the steps of:
   receiving transactional data including at least alphanumeric characters under a printer format defined by the point of sale environment;
   selecting from a web interface one of a pre-defined set of rules and a first user input; and
   creating a filter based on said selection wherein said filter includes a filter condition defined by a predetermined data sequence within the processed transactional data and a filtering action defined by a set of steps that modify a portion of the processed transactional data by deleting at least some characters from the processed transactional data received through the input in response to matching the portion of the processed transactional data with the predetermined data sequence.

8. The method according to claim 7, wherein said first user input comprises at least one subfilter.

9. The method according to claim 7, further comprising the step of modifying said filter based on a second user input from the web interface.

10. The method according to claim 9, wherein said second user input comprises at least one subfilter.

11. The method according to claim 9, wherein said step of modifying comprises at least one of adding at least one subfilter, changing at least one subfilter, and deleting at least one subfilter.

12. A non-transitory computer readable medium having computer readable program for operating on a computer for processing transactional data in a point of sale environment, said program comprising instructions that cause the computer to perform the steps of:
   receiving transactional data including at least alphanumeric characters under a printer format defined by the point of sale environment;
   selecting from a web interface one of a pre-defined set of rules and a first user input; and
   creating a filter based on said selection wherein said filter includes a filter condition defined by a predetermined data sequence within the processed transactional data and a filtering action defined by a set of steps that modify a portion of the processed transactional data by deleting at least some characters from the processed transactional data received through the input in response to matching the portion of the processed transactional data with the predetermined data sequence.

13. The computer readable program according to claim 12, wherein said first user input comprises at least one subfilter.

14. The computer readable program according to claim 12, further comprising the step of modifying said filter based on a second user input from the web interface.

15. The computer readable program according to claim 14, wherein said second user input comprises at least one subfilter.

16. The computer readable program according to claim 14, wherein said step of modifying comprises at least one of adding at least one subfilter, changing at least one subfilter, and deleting at least one subfilter.

* * * * *